June 3, 1924. 1,496,516
W. C. BETZ
BALL BEARING AND METHOD OF FORMING AND ASSEMBLING THE SAME
Filed April 3, 1923
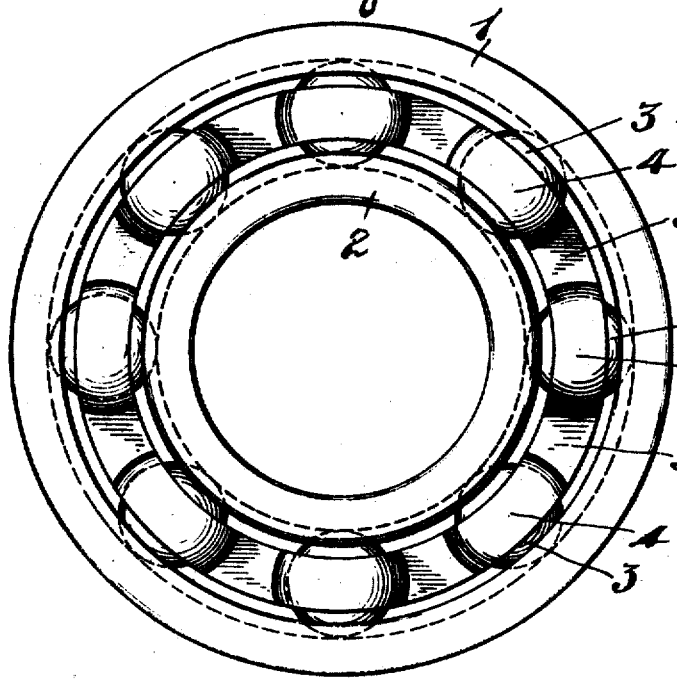
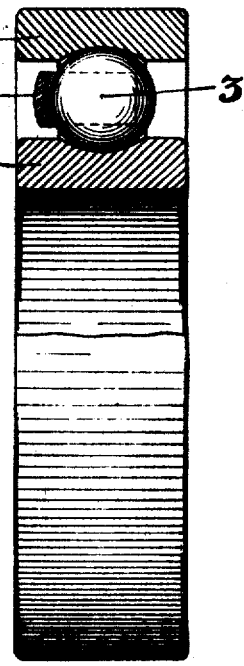
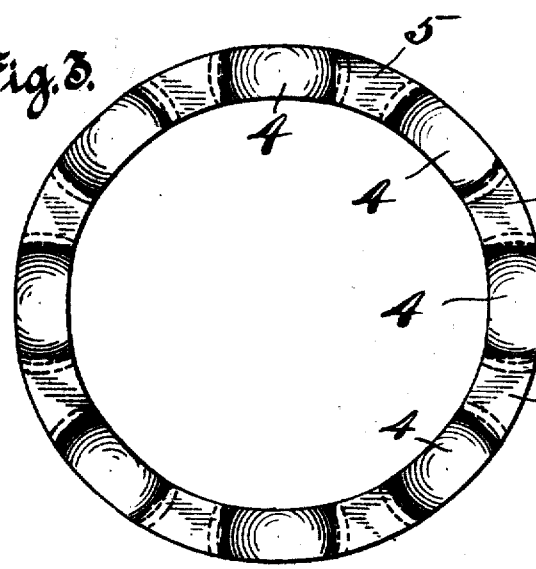
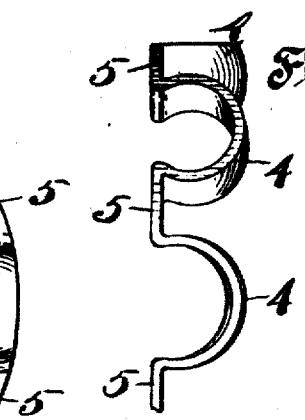
INVENTOR
W. C. Betz,
BY
Mitchell Benkers
ATTORNEYS.

Patented June 3, 1924.

1,496,516

UNITED STATES PATENT OFFICE.

WILLIAM C. BETZ, OF NEW BRITAIN, CONNECTICUT.

BALL BEARING AND METHOD OF FORMING AND ASSEMBLING THE SAME.

Application filed April 3, 1923. Serial No. 629,607.

*To all whom it may concern:*

Be it known that I, WILLIAM C. BETZ, a citizen of the United States of America, residing at New Britain, Connecticut, have invented a new and useful Improvement in Ball Bearings and Methods of Forming and Assembling the Same, of which the following is a specification.

My invention relates to certain new and useful improvements in ball bearings of the "unit handling" type, and particularly to the spacing means for the balls. My main object is to provide a very simple and effective means which will hold the balls in proper spaced relation and which may be cheaply made and easily applied and removed.

In the drawings:

Fig. 1 is a side elevation of a ball bearing embodying my invention.

Fig. 2 is a quarter sectional view.

Fig. 3 is a side view of the ball spacer detached, said view being opposite to that shown in Fig. 1.

Fig. 4 is a fragmentary view of the spacer looked at from the edge.

1—2 represent two concentric bearing rings arranged one within the other, said rings having complementary ball raceways formed therein for the reception of balls 3—3. These raceways are preferably uninterrupted and continuous throughout their length, and the balls and the rings are assembled by the well-known method of first displacing the ring 2 eccentrically with relation to the ring 1, and then introducing into the open space between the rings as many balls as possible. The rings are then brought into concentric relation and the balls are distributed around the race ways and then the spacing means is applied.

The means for spacing the balls comprises an annular strip of sheet metal shaped to form, at substantially equal intervals, ball pockets 4—4 open at one side of said annulus. The wall of each ball pocket is preferably corrugated or channeled, as seen by reference to Fig. 1, one advantage being to stiffen the same. 5—5 are substantially rigid or non-compressible bridging pieces or sections, each of which connects the ends of adjacent ball pockets 4—4. The space between the ends of such adjacent bridging pieces 5—5 as are to be utilized to hold the spacer in place is slightly less than the diameter of the ball adapted to the intervening pocket, and the depth of the ball pocket is slightly more than one-half of the ball diameter; hence, when the spacer is in place, the presence of the ball in the pocket will hold the spacer in place against accidental detachment. By the arrangement shown, the spacers may be snapped into place even though each bridge 5 is non-compressible and is of greater length than the space between adjacent balls. When the spacer is to be applied to a bearing, each bridging piece first encounters two adjacent balls, and since the space between the balls is less than the length of certain or all of said bridging pieces, it is obvious that such bridging piece cannot be applied or removed unless some sort of deformation takes place. As pressure is applied to the side of the spacer ring, the presence of the balls in the mouths of the ball pockets tends to crowd the spacer portions 5—5 outwardly or radially relatively to the center of the bearing, thereby producing a twist in the spacer ring throughout its circumference. Naturally, this results in opening the mouth of each ball pocket sufficiently to permit the bridging pieces to snap through the wider spaces outside of the adjacent points of adjacent balls, whereupon the resiliency of the metal of the spacer restores said spacer to its normal shape and the bridging pieces relied upon to hold the spacer in place will be slightly less than the diameter of the ball therein. While it is preferred that the length of each bridging section 5 should be slightly greater than the shortest distance between the two balls adjacent thereto, this is not essential, as a fewer number of such bridging sections for retaining purposes will of course serve to hold the spacer in place.

It will be noted that the ball bearing shown and described is of the type known as a "unit handling" bearing, and that the invention relates to a ball spacer construction which is especially adapted to a bearing of that type.

What I claim is:

1. In a ball bearing, two spaced bearing rings, one arranged concentrically within the other, said rings having continuous and uninterrupted raceway grooves therein, balls in said raceway grooves serving to hold the same in assembled relation, a ball spacing means comprising a sheet metal annulus bent to form a plurality of ball receiving pockets open at one side of said annulus, certain of said pockets being of slightly greater depth than one-half the diameter of the balls carried therein, and substantially non-compressible bridging pieces connecting the ends forming adjacent ball pockets, certain of said bridging pieces being of slightly greater length than the space between the balls adjacent thereto, the space between said bridging pieces and the inside of the outer ring being sufficient to permit the said longer bridging pieces to be sprung outwardly in a radial direction relatively to the center of the bearing whereby said spacer may be snapped into place.

2. In a ball bearing, two spaced bearing rings, one arranged concentrically within the other, said rings having continuous and uninterrupted raceway grooves therein, balls in said raceway grooves serving to hold the same in assembled relation, a ball spacing means comprising a sheet metal annulus bent to form a plurality of ball receiving pockets open at one side of said annulus, said pockets being of slightly greater depth than one-half the diameter of the balls carried therein, and substantially non-compressible bridging pieces connecting the ends forming adjacent ball pockets, said bridging pieces being of slightly greater length than the space between the balls adjacent thereto, the space between said bridging pieces and the inside of the outer ring being sufficient to permit the said bridging pieces to be sprung outwardly in a radial direction relatively to the center of the bearing whereby said spacer may be snapped into place.

3. The method of forming and applying a ball spacer to a unit handling ball bearing composed of two concentric rings having confronting ball races with balls therein, said method comprising first forming a sheet metal annulus with ball pockets in one side of a depth slightly greater than one half the diameter of an individual ball, the ends of adjacent pockets being connected by substantially noncompressible bridges some of which are slightly greater in length than the space between the balls adjacent thereto, then applying said spacer to said balls with said balls facing said pockets, then applying force on said spacer sufficient to cause those parts carrying the longer bridges to momentarily move radially sufficient to open the ends of the adjacent pockets to such an extent as to permit the adjacent balls to pass into the pockets whereby said spacer will snap into the ball spacing position.

WILLIAM C. BETZ